(12) United States Patent
Miyajima

(10) Patent No.: US 12,716,721 B2
(45) Date of Patent: Aug. 25, 2026

(54) INFORMATION PROCESSING DEVICE, INFORMATION PROCESSING DEVICE CONTROL METHOD, AND STORAGE MEDIUM

(71) Applicant: TOPCON CORPORATION, Tokyo (JP)

(72) Inventor: Motohiro Miyajima, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 466 days.

(21) Appl. No.: 17/788,637

(22) PCT Filed: Jan. 12, 2021

(86) PCT No.: PCT/JP2021/000621
§ 371 (c)(1),
(2) Date: Jun. 23, 2022

(87) PCT Pub. No.: WO2021/145299
PCT Pub. Date: Jul. 22, 2021

(65) Prior Publication Data

US 2023/0035788 A1 Feb. 2, 2023

(30) Foreign Application Priority Data

Jan. 16, 2020 (JP) ................................ 2020-005076

(51) Int. Cl.
*G01C 15/00* (2006.01)
*H04B 5/70* (2024.01)
*F16L 1/00* (2006.01)

(52) U.S. Cl.
CPC ............. *G01C 15/004* (2013.01); *F16L 1/00* (2013.01); *H04B 5/70* (2024.01)

(58) Field of Classification Search
CPC .... B25J 9/1689; G01C 15/004; G01C 15/002; G01C 15/006; G01C 15/008;
(Continued)

(56) References Cited

U.S. PATENT DOCUMENTS 5,450,079 A 9/1995 Dunaway
9,377,303 B2 6/2016 Giger et al.
(Continued)

FOREIGN PATENT DOCUMENTS

CN 1119736 A * 4/1996 ........... G01C 15/004
DE 102006005365 A1 * 8/2007 ......... G05B 19/0426
(Continued)

OTHER PUBLICATIONS

International Search Report issued in the corresponding patent application No. PCT/JP2021/000621 mailed Apr. 6, 2021.
(Continued)

*Primary Examiner* — Catherine T. Rastovski
*Assistant Examiner* — Eric Sebastian Von Wald
(74) *Attorney, Agent, or Firm* — Studebaker Brackett PLLC

(57) ABSTRACT

Provided is an information processing device includes a processor, a display, an operation unit, and a near field wireless communication unit capable of communicating with a laser device detecting horizontality and emitting a laser beam at a set gradient, the processor causes the information processing device to realize a remote controller function to remotely operate the laser device via the near field wireless communication unit, to acquires status information showing an operation status of the laser device via the near field wireless communication unit, and to display a pictogram representing a status of the laser device corre-
(Continued)

sponding to the status information and an icon for calling the remote controller function on a control initial screen for remote operation.

8 Claims, 11 Drawing Sheets

(58) Field of Classification Search
CPC ........ G01C 15/00; G01C 5/00; G03B 21/206; G05B 2219/36159; G05B 19/0421; G05B 2219/23135; G05B 2219/25204; G06F 8/38; G06F 9/451; G06F 3/147; G06F 3/0383; G06F 3/048; G08C 17/00; G08C 17/02; G08C 2201/32; G08C 2201/71; G08C 2201/21; G08C 2201/51; G08C 2201/93; H04B 1/202; H04B 17/17; H04B 17/23; H04N 1/00344; H04N 1/32625; H04N 1/00315; H04N 1/00408; H04N 21/4126; H04N 21/41265; H04N 21/42204; H04Q 2209/75; H04Q 9/00; H04W 4/80
See application file for complete search history.

(56) References Cited

U.S. PATENT DOCUMENTS 9,609,288 B1* 3/2017 Richman .............. G06V 20/176
9,714,830 B2* 7/2017 Zhou ........................ G01C 3/08
10,690,498 B2* 6/2020 Turner .................... G01S 19/13
2006/0012821 A1* 1/2006 Franklin ................ G06K 1/126 358/1.15
2006/0113375 A1* 6/2006 Caiger ................. B23K 26/032 235/376
2012/0130675 A1* 5/2012 Schorr ................. G01C 15/105 33/286
2016/0033652 A1* 2/2016 Gil .......................... G01S 19/46 342/357.29
2016/0085773 A1* 3/2016 Chang ................... H04W 4/029 715/753
2016/0207465 A1* 7/2016 Arai ...................... B60R 1/1207
2017/0097420 A1 4/2017 Nagashima et al.
2018/0085188 A1* 3/2018 Boutoussov ......... A61C 1/0015
2018/0095528 A1* 4/2018 Tao .......................... G09G 5/00
2018/0152590 A1* 5/2018 Zakharov ........... H04N 1/32625
2018/0186284 A1* 7/2018 Egly ........................ B60Q 3/16
2018/0188460 A1* 7/2018 Paniccia .............. G02B 6/4292
2018/0203120 A1* 7/2018 Nagalla ................... G01S 7/003
2018/0275814 A1* 9/2018 Hosokawa ................ G06F 3/14
2019/0110845 A1* 4/2019 Yang ...................... A61B 18/24
2019/0302273 A1 10/2019 Sano et al.
2020/0041627 A1* 2/2020 Becker .................... G01S 17/32
2020/0096641 A1* 3/2020 Sasaki ..................... G06T 17/00
2021/0372768 A1* 12/2021 Müller ................... G01C 15/06

FOREIGN PATENT DOCUMENTS

| | | | |
|---|---|---|---|
| DE | 102013217479 | A1 | 3/2015 |
| JP | 2003-74746 | A | 3/2003 |
| JP | 2017-116437 | A | 6/2017 |

OTHER PUBLICATIONS

Werner Stempfhuber, “Performance of Geodetic Monitoring Systems,” Construction Technology 89, 2012, pp. 794-802, Issue 11, XP 71800570.

* cited by examiner 2
22
40
41
42
43
50
51
60
61
62
63
64
65
66
66a
66b
67
68
69
+ 4.000%
150
140
141
Laser product support
Setting
Version information
Administrator mode
Login

Fig.8

| Status | Pictogram | Details |
| --- | --- | --- |
| Connection status | 0 1 | 0: Connection OK / 1: Connection NG |
| Battery status | 0 1 2 | 0: FULL / 1: Decreased by 1 level/ 2: Decreased by 2 levels |
| Laser mode status | 0 1 2 | 0: Normal / 1: Blink / 2: Low output |
| Rotation direction tilt status | | Display on scale of ±10 from center |
| Vertical laser status | or undisplayed | Vertical laser ON/OFF |
| Lock status | or undisplayed | Gradient setting function lock/unlock |

Fig. 9 (A)

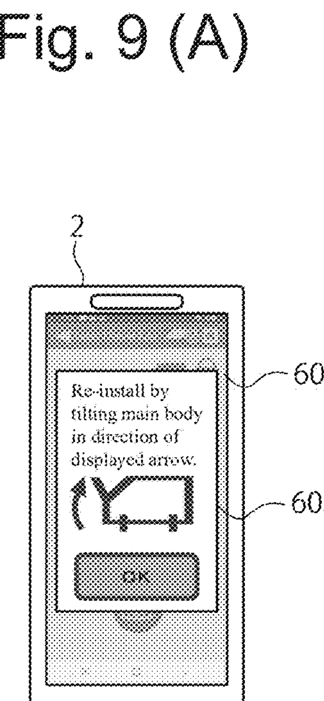

Fig. 9 (B)

Examples of warning display

| Icon | Type of Warning | Warning message | Description |
|---|---|---|---|
| | Leveling warning | Re-install by tilting main body in direction of displayed arrow. | This icon is displayed when the tilt of the main body exceeds the range of ±100% (±10%) of set gradient. The laser blinks slowly. |
| | Leveling warning | | |
| | Rotation warning | Rotate main body in direction of displayed arrow, and reset so that rotation direction bubble tube indication comes to center. | This icon is displayed when the main body rotates over the correction range of ±4° (±2° when vertical laser is on). The laser blinks slowly. |
| | Rotation warning | | |
| | Rotation direction detection error | Re-install main body horizontally. | |
| | Under laser position adjustment | After restoring from WAIT display, work can be performed. | This is displayed when the position of the laser after startup of the main body is adjusted. |
| | Safety-locked | To restart work, turn OFF power supply on main body operation panel, confirm installation, and then turn ON power supply again. | In safety-locked state, power supply cannot be turned ON/OFF with the mobile terminal. |
| | Battery depleted | Unavailable. Replace with charged battery. | In this case, the laser and the top LED do not light up. After several minutes, these are automatically powered OFF. |

2
130
131
132
22
60
64
65
69
68
66b
66a
66
63
+ 4.000%
67
61
62
120
121
Support
70
71
73
74
76
+ 2.000%
72
75

+ 2.000%
66b
2
22
70
72
73
74
75
76
80
81
82
83
90
90A
90B
91
92
93
94
95
96
97
110
111
112
113
114

INFORMATION PROCESSING DEVICE, INFORMATION PROCESSING DEVICE CONTROL METHOD, AND STORAGE MEDIUM

TECHNICAL FIELD

The present invention relates to an information processing device, an information processing device control method and program, and more specifically, to an information processing device, an information processing device control method and program for remotely operating a laser device by using a mobile terminal.

BACKGROUND ART

Conventionally, as a laser device, a pipe laser that emits a reference laser at a set gradient for laying a pipe such as a water pipe or a sewerage pipe, along the set gradient, has been known. Patent Literature 1 discloses a pipe laser with a remote control device. The remote control device of Patent Literature 1 can control turning on/off of a laser beam for setting a gradient and execute a line control function to adjust an orientation of the laser beam so that the center of the laser beam is aligned with the center of a target.

CITATION LIST

Patent Literature

[Patent Literature 1]Japanese Published Unexamined Patent Application No. 2003-74746

SUMMARY OF INVENTION

Technical Problem

However, the remote control device disclosed in Patent Literature 1 only causes a pipe laser to remotely execute a predetermined function, and for example, it is impossible to confirm an operation status of the pipe laser by the remote control device. In addition, the remote control device has to have a dedicated configuration for the pipe laser.

The present invention was made in view of these circumstances, and an object thereof is to provide a technology capable of remotely operating a laser device with a general-purpose mobile terminal such as a smartphone.

Solution to Problem

In order to achieve the object described above, an information processing device according to an aspect of the present invention includes a control unit, a display unit, an operation unit, and a near field wireless communication unit capable of communicating with a laser device configured to detect horizontality and emit a laser beam at a set gradient, wherein the control unit includes a control function unit configured to realize a remote controller function to remotely operate the laser device via the near field wireless communication unit, the control function unit acquires status information showing an operation status of the laser device via the near field wireless communication unit, and the control function unit displays a pictogram representing an operation status of the laser device corresponding to the status information and an icon for calling the remote controller function on a control initial screen for remote operation.

In the aspect described above, it is also possible that the status information includes at least a laser beam irradiation status in the laser device.

In the aspect described above, it is also possible that the pictogram is expressed in a color reflecting a color related to information represented by the pictogram.

In the aspect described above, it is also possible that the information processing device includes a storage unit storing information for assisting a work using the laser device, the control function unit has a work assisting function to make browsable the information for assisting the work, and the display unit displays an icon for calling the work assisting function on the control initial screen.

In the aspect described above, it is also possible that the control function unit acquires the status information in real time or at predetermined intervals, determines whether there is an abnormality in the status information, and when there is an abnormality, displays a warning display on the display unit, and when the abnormality is solved, cancels the warning display.

In the aspect described above, it is also possible that the information processing device further includes a network communication unit capable of communicating with a server device via a communication network, the control unit includes an administrator function unit configured to manage the laser device, and the administrator function unit acquires version information of firmware of the laser device, and when the version of the firmware is not the latest, updates the firmware to the latest state.

In the aspect described above, it is also possible that the administrator function unit acquires log data of the laser device via the near field wireless communication unit, and manages the log data.

An information processing device control method according to another aspect of the present invention is an information processing device control method to be executed by an information processing device including a display unit, a control unit, an operation unit, and a near field wireless communication unit capable of wirelessly communicating with a laser device configured to emit a laser beam at a set gradient, and includes a step of acquiring status information showing an operation status of the laser device by the control unit via the near field wireless communication unit, and a step of displaying, by the display unit, a pictogram representing an operation status of the laser device corresponding to the status information, and an icon for causing the control unit to execute a remote controller function to remotely operate the laser device via the near field wireless communication unit, on a control initial screen for remote operation.

A program according to another aspect of the present invention is a program for executing the above-described information processing device control method to be executed by an information processing device including a display unit, a control unit, an operation unit, and a near field wireless communication unit capable of wirelessly communicating with a laser device configured to emit a laser beam at a set gradient.

In this specification, the "icon" indicates details of a function as a figure or picture, and calls a corresponding function and executes a program for performing the function by being tapped or clicked.

In this specification, the "pictogram" is a visual sign indicated as a simplified figure for representing information, and for example, the reference sign 66 in FIG. 6 denotes a pictogram representing a pipe laser operation status. In this specification, the "pictogram" may simply represent information, or as with the icon, may call a corresponding function and execute a program for performing the function.

Benefit of Invention

According to the aspect described above, a laser device can be remotely operated with a general-purpose mobile terminal such as a smartphone.

BRIEF DESCRIPTION OF DRAWINGS

FIG. 8 is a diagram describing examples of pictograms of status information on a control initial screen of the control function described above.

FIGS. 9(A) and 9(B) are diagrams describing examples of warning display when an abnormality is found in status information in the system.

DESCRIPTION OF EMBODIMENT(S)

Hereinafter, preferred embodiments of the present invention will be described with reference to the drawings, however, the present invention is not limited to these.

(Outline of Configuration and Function of Remote Operation System)

Figure 1:
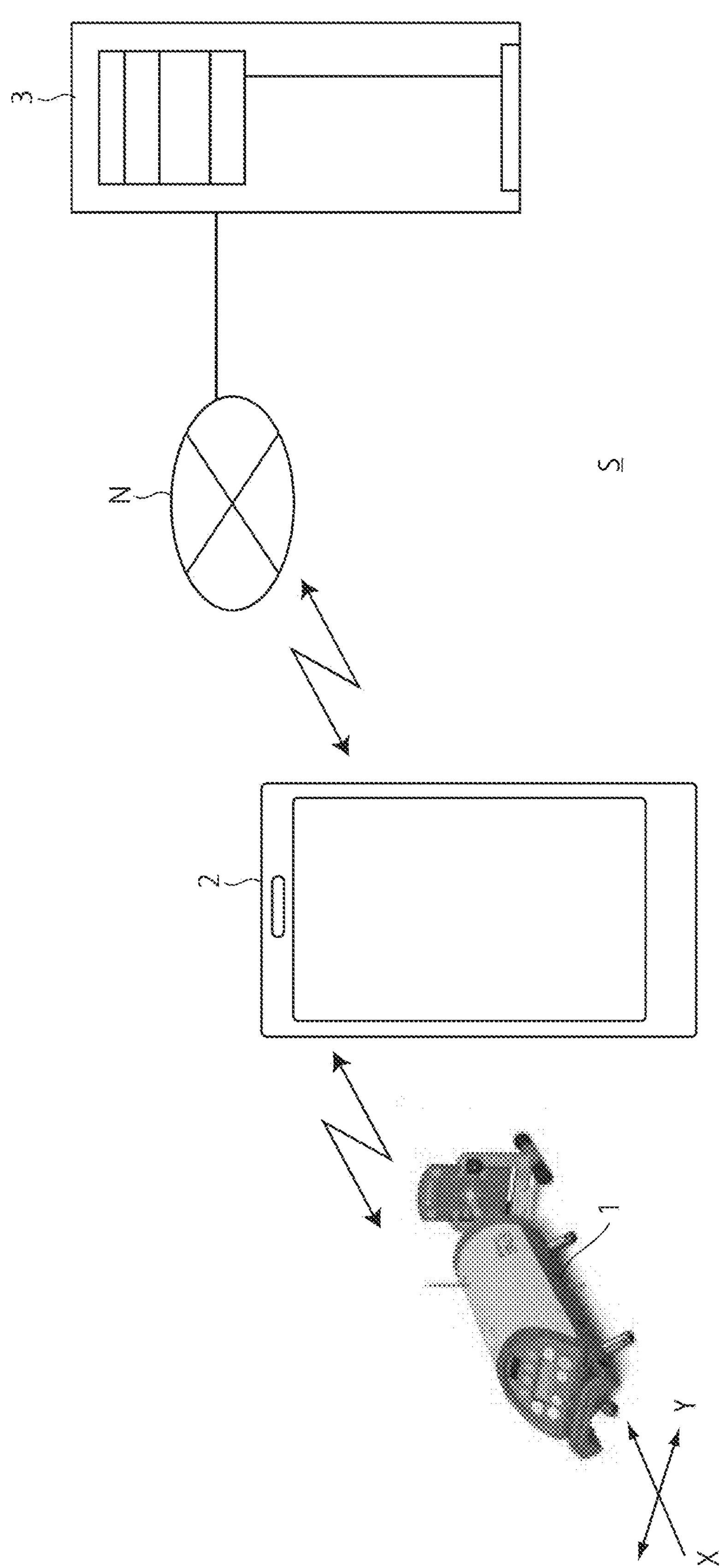
FIG. 1 is a view illustrating an example of a general configuration of a remote operation system including an information processing device (mobile terminal) according to an embodiment of the present invention.
Figure 2:
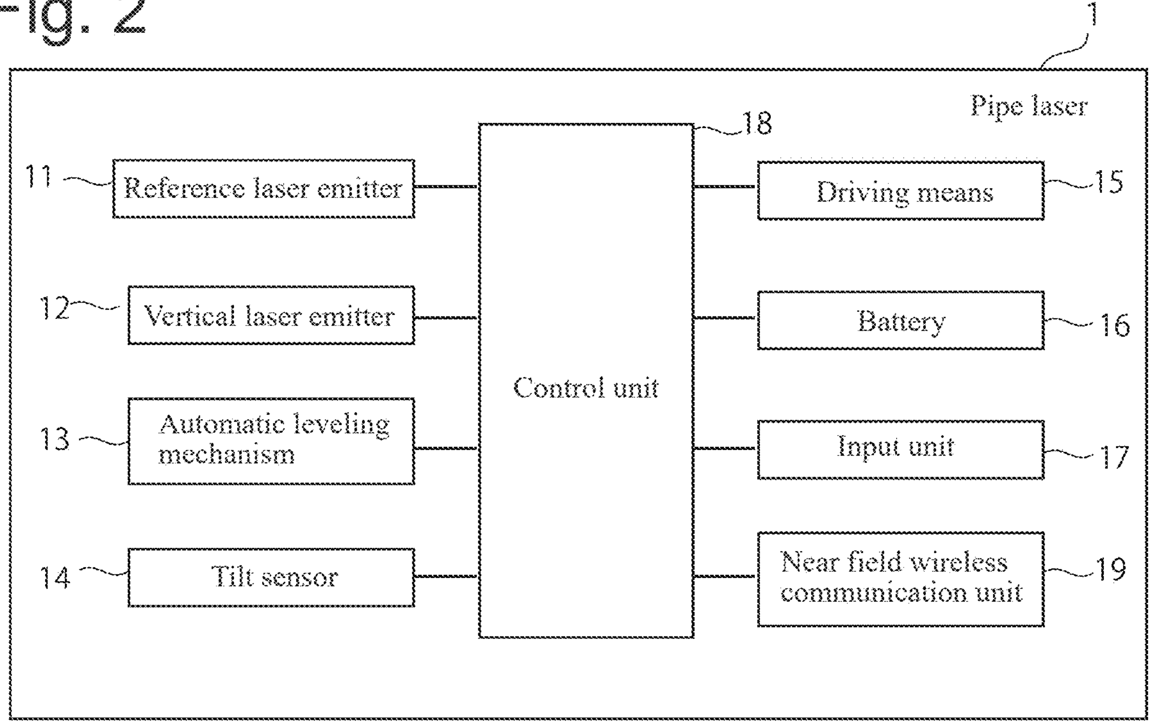
FIG. 2 is a diagram illustrating an example of a general configuration of a laser device (pipe laser) as an object to be remotely operated by the system.
Figure 3:
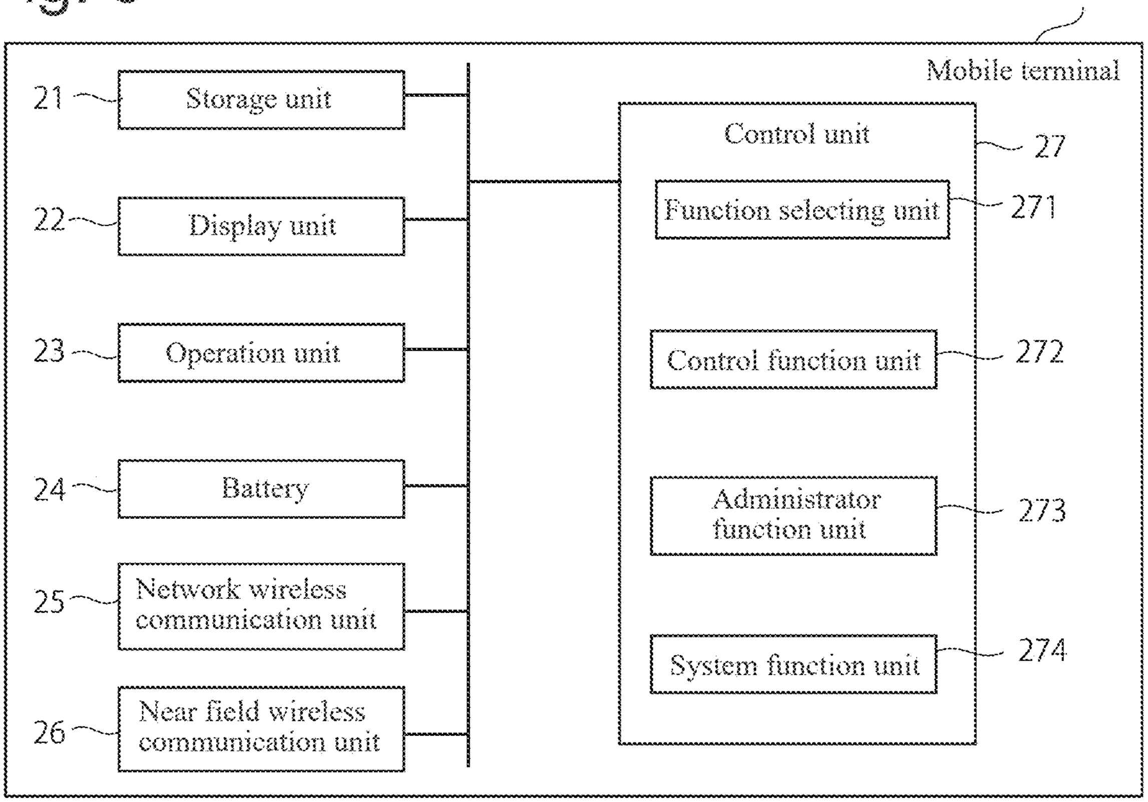
FIG. 3 is a diagram illustrating an example of an outline of a configuration of an information processing device (mobile terminal) in the system.
Figure 4:
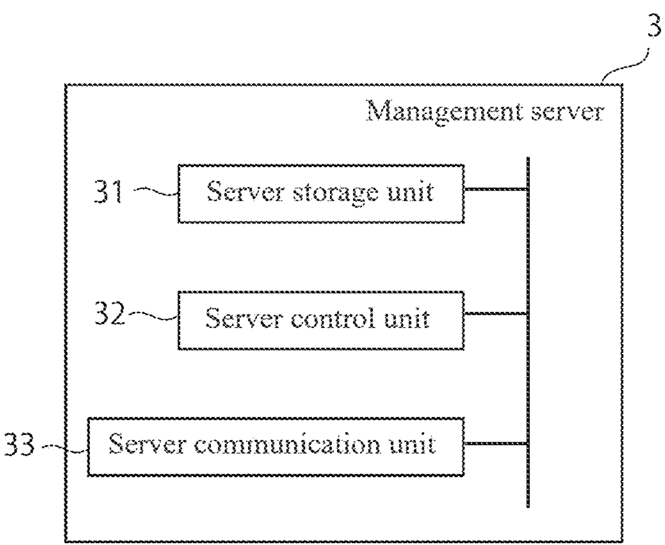
FIG. 4 is a diagram illustrating an example of an outline of a configuration of a server device (server device) in the system.

FIG. 1 is a view illustrating an example of a general configuration of a remote operation system S including an information processing device according to an embodiment. FIG. 2 is a diagram illustrating a general configuration of a pipe laser 1 that is an example of the laser device as an object to be remotely operated by the remote operation system S. FIG. 3 is a diagram illustrating a general configuration of a mobile terminal 2 that is an example of the information processing device. FIG. 4 is a diagram illustrating a general configuration of a server device that is an example of the server device.

The remote operation system S includes the pipe laser 1, the mobile terminal 2, and the server device 3. The mobile terminal 2 and the server device 3 are configured to be capable of communicating with each other via a communication network N. The communication network N is composed of, for example, a mobile communication network, the internet, etc.

The pipe laser 1 includes a reference laser emitter 11, a vertical laser emitter 12, an automatic leveling mechanism 13, tilt sensors 14, a driving means 15, a battery 16, an input unit 17, a control unit 18, and a near field wireless communication unit 19, etc.

The reference laser emitter 11 emits a reference laser beam for setting a gradient of a pipe such as a water pipe or a sewerage pipe. The vertical laser emitter 12 emits a vertical laser beam showing an up/down position in the vertical direction. The automatic leveling mechanism 13 automatically detects a horizontal plane. The tilt sensors 14 are inclination sensors, and are respectively provided in a reference laser emitting direction (X direction in FIG. 1) and a rotation direction (Y direction in FIG. 1) of the pipe laser 1, and detect tilts of the reference laser emitter 11 in the X direction and the Y direction.

The driving means 15 turns the reference laser emitter 11 in the X direction and the Y direction. The battery 16 is composed of a rechargeable battery, etc. The input unit 17 is an operation button, etc., configured to be capable of inputting the setting of a gradient value.

The control unit 18 drives the driving means 15 based on detection results of the automatic leveling mechanism 13 and the tilt sensors 14 to cause the reference laser emitter 11 to emit light so as to irradiate a reference laser beam at a set gradient. In addition, the control unit 18 is configured to execute a line control function to adjust the orientation of the laser beam so that the center of the laser beam is aligned with the center of a target. The control unit 18 may be configured to execute an auto alignment function to automatically align the center of the laser beam with the center of a target. The control unit 18 is configured to be capable of adjusting a tilt of the pipe laser in the rotation direction by controlling the driving means 15. Bluetooth (registered trademark) is applied to the near field wireless communication unit 19.

The pipe laser 1 can output instrument information as basic information of the pipe laser 1 as an instrument, such as a model code, a serial number, and version information, status information showing an operation status of the pipe laser 1 such as a connection state, remaining battery capacity, a current gradient value, a reference laser beam emission mode, a vertical laser beam emitting condition (ON/OFF), and a tilt in the rotation direction, and management information such as log data and firmware (FW) version information, via the near field wireless communication unit 19 on a request from the mobile terminal 2. The pipe laser 1 is configured to execute a command from the mobile terminal 2 via the near field wireless communication unit 19.

Except for the configuration capable of outputting the information described above and executing a command from the mobile terminal 2 via the near field wireless communication unit 19, the pipe laser 1 may have a configuration of a publicly known pipe laser disclosed in Patent Literature 1, JP 2001-330437 A, etc., or commercially available, and detailed description of this is omitted.

The mobile terminal 2 includes a storage unit 21, a display unit 22, an operation unit 23, a battery 24, a network wireless communication unit 25, a near field wireless communication unit 26, and a control unit 27. The mobile terminal 2 is an example of the remote operation device in the present invention. As the mobile terminal 2, for example, a general-purpose portable wireless communication device such as a mobile phone, a smartphone, a tablet, and a portable game machine, or a portable wireless communication device dedicated to the present invention, can be applied.

The storage unit 21 is composed of a nonvolatile memory, for example, a flash memory, an EEPROM (Electrically Erasable Programmable Read-Only Memory), etc. In the storage unit 21, an OS (Operating System) and a remote operation execution program for the pipe laser 1 are stored. The remote operation execution program for the pipe laser 1 can be downloaded from the server device 3 via the network wireless communication unit 25. Alternatively, it may be downloadable from a server other than the server device. The storage unit 21 stores a status log and an error log of the pipe laser 1.

The remote operation execution program for the pipe laser 1 may be pre-installed in the mobile terminal 2. In this case, the mobile terminal 2 is provided (for example, rented or sold) to a user in a state where the remote operation execution program is pre-installed in the mobile terminal 2. Alternatively, this program may be read into the storage unit 21 via a drive from a recording medium such as a CD or DVD provided to the user in a state where the program is stored in the recording medium. Further, the storage unit 21 stores various setting data on remote operations of the pipe laser 1, and data on status information, instrument information, and management information of the pipe laser, and version information of the pipe laser, received from the pipe laser.

The display unit 22 and the operation unit 23 are integrally configured as a touch panel display. The display unit 22 displays various screens for remotely operating the pipe laser 1. The operation unit 23 is an icon display, a button display, and a keypad display, etc., to be used by a user to input operation instructions, etc.

The battery 24 is composed of a rechargeable battery, etc. The battery 24 supplies electric power to each component of the mobile terminal 2.

The near field wireless communication unit 26 receives various information including instrument information, status information, and management information transmitted from the pipe laser 1 via an antenna. In addition, the near field wireless communication unit 26 transmits commands from the control unit 27 to the pipe laser 1. As a communication system of the near field wireless communication unit 26, Bluetooth (registered trademark) is applied. However, the communication systems of the near field wireless communication unit 19 of the pipe laser 1 and the near field wireless communication unit 26 of the mobile terminal 2 are not limited to Bluetooth, and for example, NFC (Near Field Communication) and infrared communication, etc., are also applicable. In any case, the same communication system is applied to the near field wireless communication unit 19 and the near field wireless communication unit 26.

The network wireless communication unit 26 makes wireless communication using an internet protocol with the internet via a base station or a router in a mobile communication network. As a result, the control unit 27 can access the server device 3 via the communication network N. The control unit 27 can download a program for remotely operating the pipe laser 1 from the server device 3 via the communication network N.

The control unit 27 is a processing unit composed of, for example, a CPU (Central Processing Unit), a ROM (Read Only Memory), and a RAM (Random Access Memory), etc.

The control unit 27 includes, as function units, a function selecting unit 271, a control function unit 272, an administrator function unit 273, and a system function unit 274. A remote operation execution program for the pipe laser 1 is executed as an app of the mobile terminal by the function selecting unit 271, the control function unit 272, the administrator function unit 273, and the system function unit 274.

The function selecting unit 271 causes the display unit 22 to display a function selection screen 40 for selecting a function, and selects a function to be executed according to a user's instructions.

The control function unit 272 has, as a remote controller, a remote controller function to remotely operate the pipe laser 1, a work assisting function to download work assistance information such as an instruction handbook by accessing a support site of a manufacturer, and enable reference materials downloaded in advance to be browsed, and a control setting function to enable confirmation of instrument information of the pipe laser 1 and make various settings in the controller function.

The administrator function unit 273 includes at least one of a firmware updating function to update firmware of the pipe laser 1, and a log data managing function to acquire log data such as a system log and an error log from the pipe laser 1 and manage the log data.

The system function unit 274 has a product assisting function to download an instruction handbook and a manual, etc., from a website of the manufacturer, classify and save the downloaded handbooks and manuals by purpose and enable browsing of them, and a various setting functions to make various settings related to the app, for example, a language to be displayed, etc., and a version information display function to display version information, etc., of the app.

Next, the server device 3 includes a server storage unit 31, a server control unit 32, and a server communication unit 33, etc.

The server storage unit 31 is composed of, for example, a hard disk drive, etc. The server storage unit 31 stores an OS and firmware of the pipe laser 1. In addition, the server storage unit 31 stores an ID and a password assigned in advance by an administrator such as a manufacturer or an agent. In the server storage unit 31, the remote operation execution program and information such as an instruction handbook of the pipe laser, provided by the manufacturer, may be stored.

The server control unit 32 is composed of, for example, a CPU, a ROM, and a RAM, etc. The server control unit 32 performs ID authentication on a request from the mobile terminal 2. In addition, on a request from the mobile terminal 2, the server control unit 32 confirms the version of firmware of the pipe laser 1, and when the firmware is not the latest, downloads the latest firmware into the mobile terminal 2.

The server communication unit 33 is an interface for connecting to the communication network N.

<Remote Operation Method for Pipe Laser>

Figure 5:
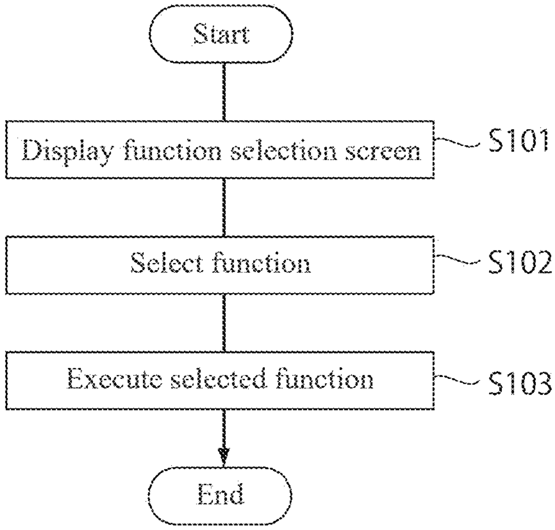
FIG. 5 is a flowchart of processing for executing an app to be executed in the system.
Figure 6:
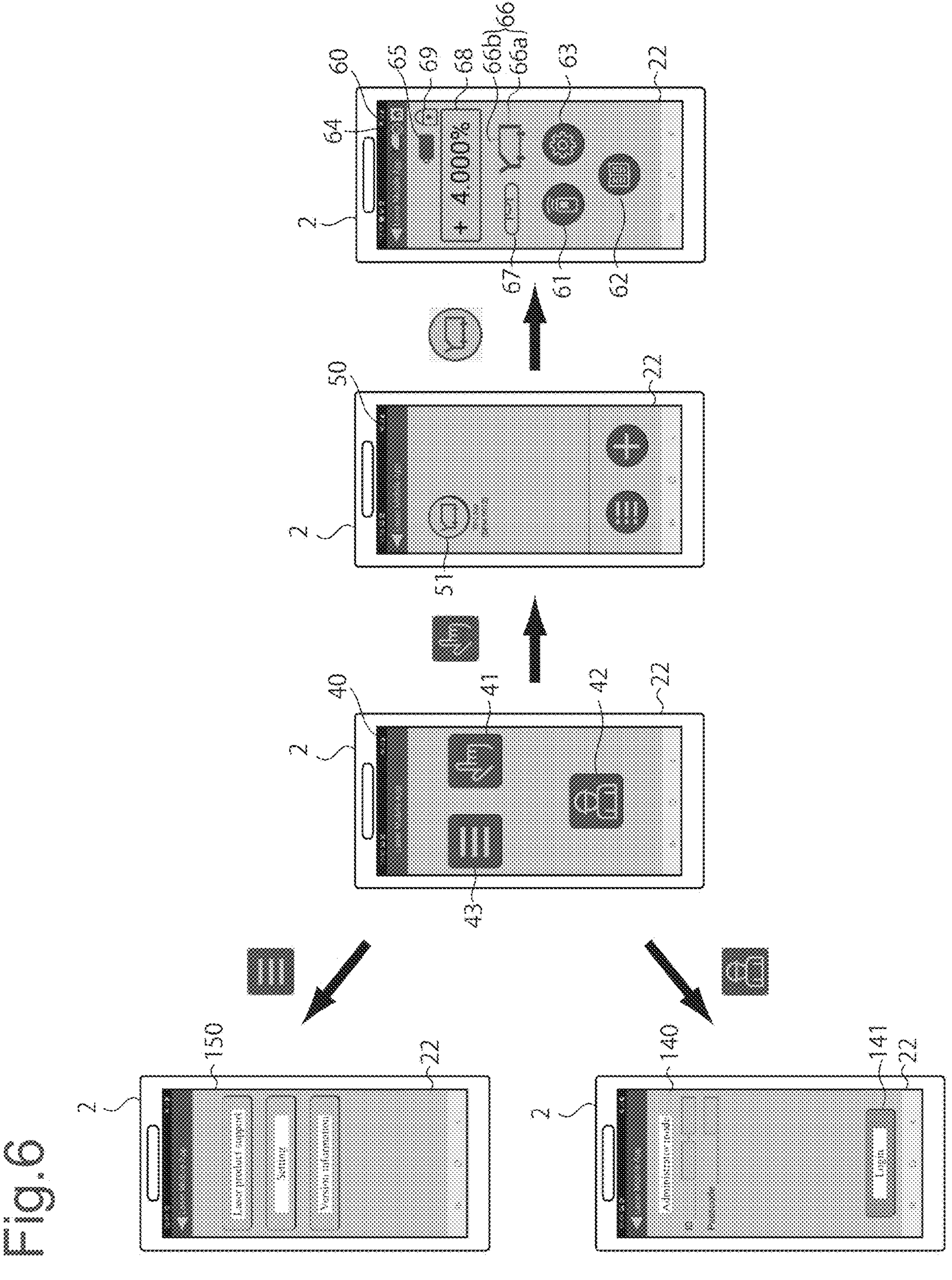
FIG. 6 is a view describing a screen shift from a function selection screen of the app.

Next, an example of remote operation execution processing for the pipe laser 1 by using the mobile terminal 2 will be described. FIG. 5 is a flowchart of processing when the app starts. FIG. 6 is a view illustrating a screen shift of the display unit from the time of app startup.

First, when starting the app by tapping an icon of the app, the display unit 22 displays a function selection screen 40. On the function selection screen 40, a control function icon 41, a system function icon 42, and an administrator function icon 43 respectively corresponding to the control function, the system function, and the administrator function are displayed.

Next, when a user selects and taps an icon in Step S102, a selected function is executed in Step S103. For example, when a user selects a function by tapping the control function icon 41, the function selecting unit 271 executes the control function in Step S103.

<Control Function>

Figure 7:
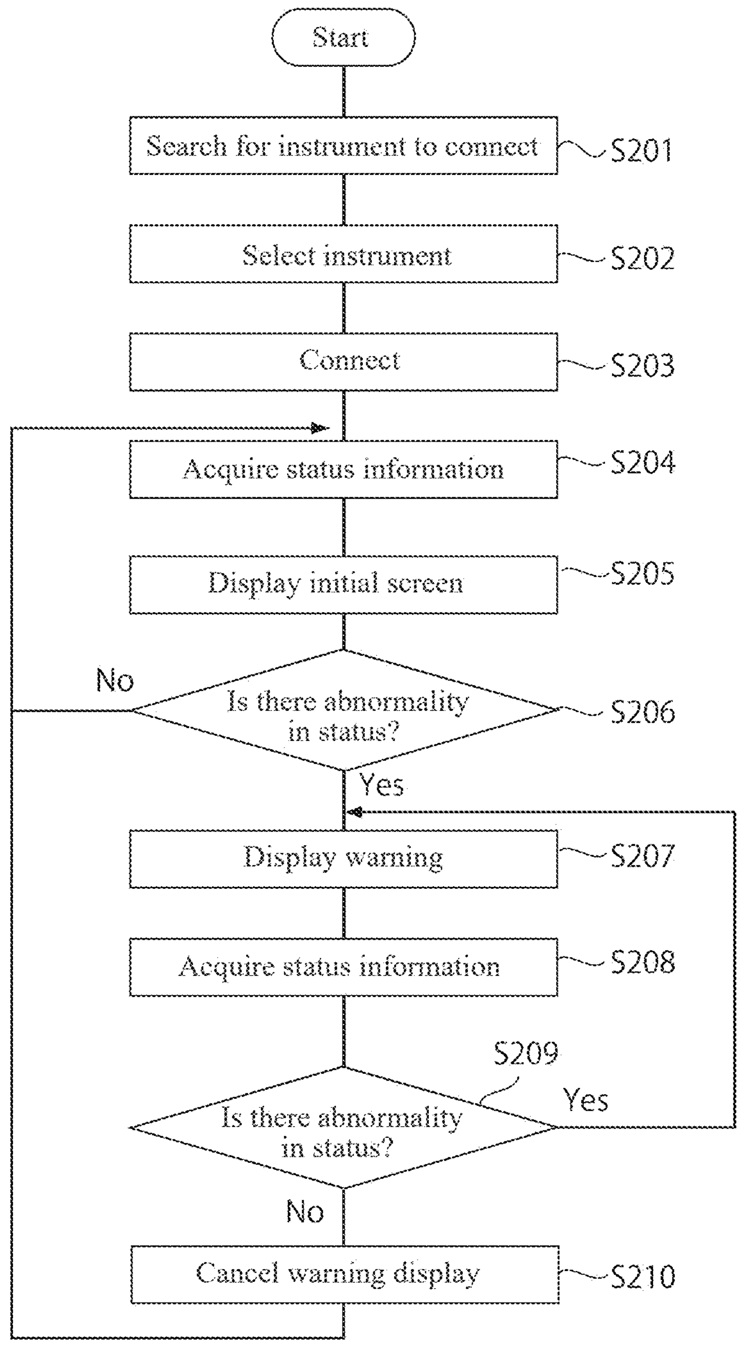
FIG. 7 is a flowchart of processing of a control function to be executed by the app.

Next, processing when the control function is selected will be described with reference to FIG. 7.

When the control function starts, in Step S201, the control function unit 272 searches for a pipe laser 1 paired with the mobile terminal 2. A search result is displayed as an instrument icon 51 on a device selection screen 50 (FIG. 6). In the example in FIG. 6, one pipe laser is displayed, however, when a plurality of paired pipe lasers are present in the vicinity of the mobile terminal 2, the plurality of pipe lasers are displayed.

Next, in Step S202, when the instrument icon 51 is selected by being tapped, in Step S203, the mobile terminal 2 connects to the tapped pipe laser 1.

Next, in Step S204, the control function unit 272 acquires status information from the pipe laser 1. Then, in Step S205, a control initial screen 60 of the control function is displayed on the display unit 22. On the control initial screen 60, the status information of the pipe laser 1, and a remote controller function icon 61, a work assisting function icon 62, and a control setting function icon 63 corresponding to each of the remote controller function, the work assisting function, and the control setting function are displayed.

As the status information, a connection status 64 showing a connection state between the pipe laser 1 and the mobile terminal 2, a battery status 65 showing remaining battery capacity of the pipe laser 1, a laser mode status 66*a* showing a reference laser irradiation mode, a rotation direction tilt status 67 showing a tilt in the rotation direction, a vertical laser status 66*b* showing a vertical laser irradiation status, and a lock status 69 showing locked/unlocked states of the gradient setting function and the auto alignment function of the pipe laser 1, are displayed in the form of pictograms. The laser mode status 66*a* and the vertical laser status 66*b* are displayed in combination with a pictogram simplifying an appearance of the pipe laser 1. In addition, a current gradient value of 68 of the pipe laser 1 is displayed in the form of a pictogram resembling the display unit of the pipe laser in combination with the numerical value.

These pictograms are preferably expressed in colors reflecting colors related to information represented by the pictograms. For example, it is also preferable that the pictogram representing the laser device is expressed so as to reflect the color of the appearance of the laser device. In addition, preferably, the pictograms representing the reference laser and the vertical laser are expressed in colors reflecting colors of the reference laser and the vertical laser so that, when the reference laser is a green laser, its pictogram is expressed in green, and when the vertical laser is red, its pictogram is expressed in red. With this configuration, even from a small image displayed on the screen of a mobile terminal such as a smartphone or a portable game machine which has a comparatively small screen, a user can more easily and accurately understand information represented by the pictograms.

In addition, the types of status information represented by the pictograms do not have to include all of the information described above. Alternatively, a configuration in which the types of status information can be set as necessary is also possible. However, preferably, the status information includes at least status information related to laser irradiation statuses (that is, the pictogram denoted by the reference sign 66). This is because the pipe laser is installed inside a water pipe, a sewerage pipe, etc., buried underground, and a user performs an operation from the ground, and therefore, it is difficult to confirm the laser irradiation statuses. In the present embodiment, a laser irradiation status is displayed in the form of a pictogram on the display unit, so that a user can intuitively understand the irradiation status, and this is preferable.

FIG. 8 illustrates detailed examples of contents indicated by the pictograms. These are just examples, and it is not essential to display all of the status information described above, and a configuration to display only necessary status information is possible. In addition, other status information may be included.

Next, in Step S206, the control function unit 272 determines whether there is an abnormality in each status described above based on determination criteria determined in advance according to each status type. For example, concerning the battery status, when the remaining battery capacity becomes less than 5%, the remaining battery capacity is determined to be low. Alternatively, when the tilt in the rotation direction becomes 5% or more, the tilt in the rotation direction is determined to be abnormal. The control function unit 272 determines that there is an abnormality in a case where the status information cannot be acquired by the reason of automatic leveling under being performed, etc.

In Step S206, when it is determined that there is no abnormality (No), the processing returns to Step S203. Then, the control function unit 272 acquires status information in real time, and displays the control initial screen 60.

In Step S206, when it is determined that there is an abnormality (Yes), in Step S207, the control function unit 272 displays a warning on the display unit 22, and stops the remote controller function. FIG. 9(A) illustrates an example of a warning screen 60A displaying a warning display superimposed on the control initial screen 60, and FIG. 9(B) illustrates examples of the warning display. The warning includes measures to solve the abnormality. In Step S208, the control function unit 272 continues acquisition of status information while displaying a warning, and in Step S209, determines whether there is an abnormality, that is, whether the abnormality has been solved. After the abnormality is solved, the processing returns to Step S203, and the control function unit 272 displays the control initial screen 60 while acquiring status information in real time. Acquisition of status information is continued even during execution of the remote controller function, the work assisting function, and the control setting function in the control function.

Figure 10:
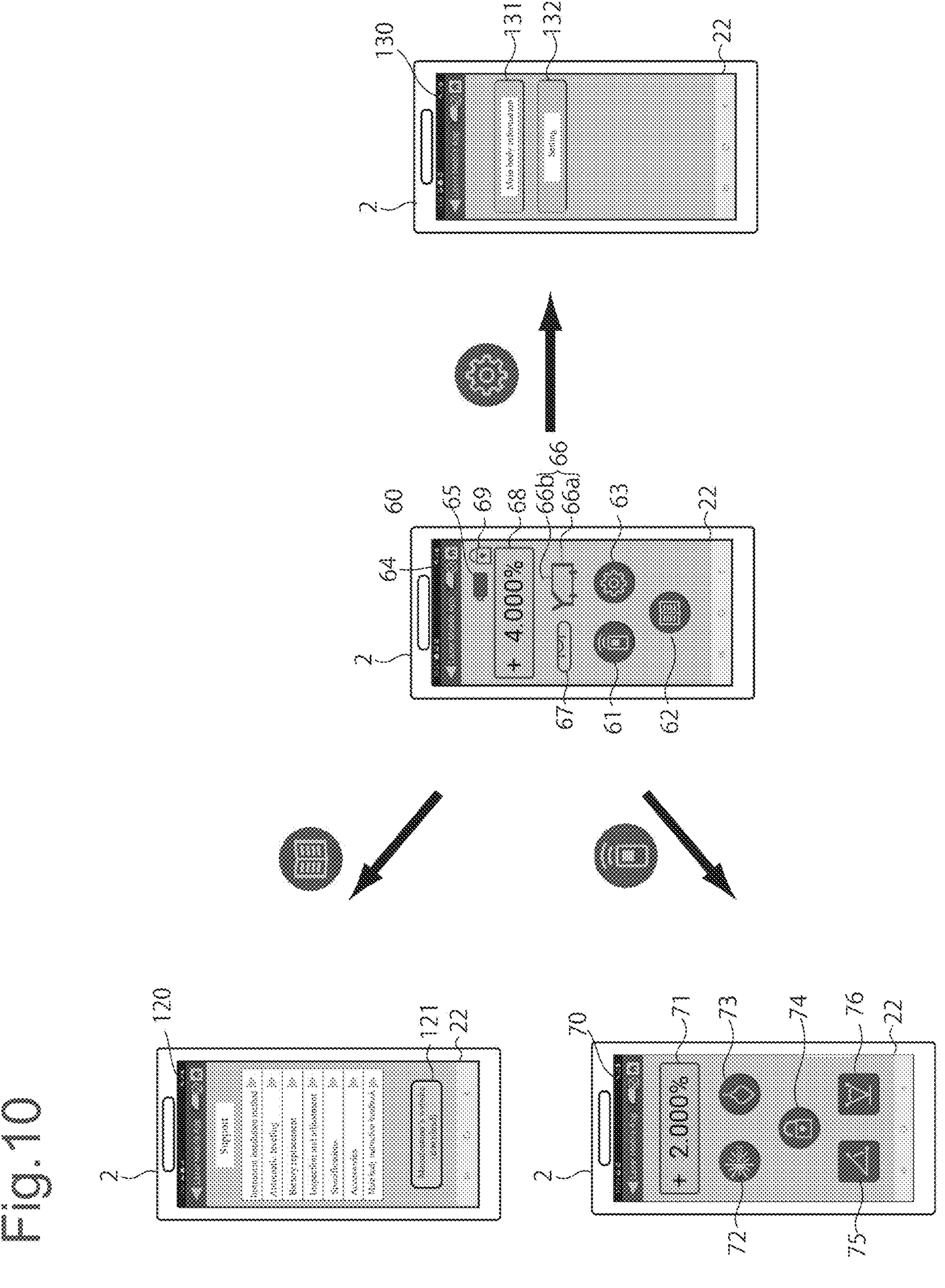
FIG. 10 is a view describing a screen shift from a control initial screen of the app.
Figure 11:
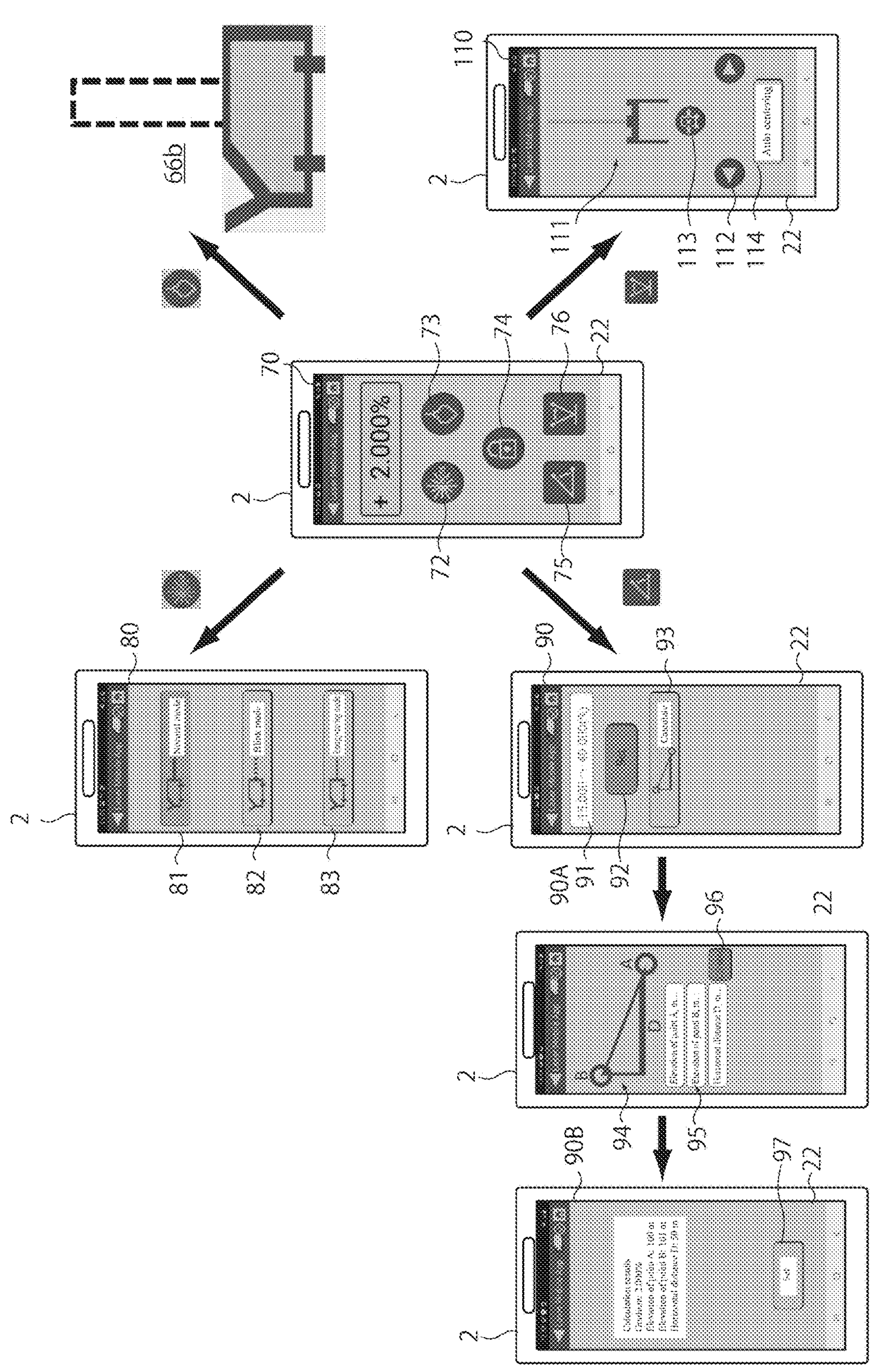
FIG. 11 is a view describing a screen shift from a remote controller screen of the app.

Next, in the control function, processing to execute each function in response to tapping of the remote controller function icon 61, the work assisting function icon 62, and the control setting function icon 63 from the state where the control initial screen 60 is displayed, will be described with reference to FIGS. 10 and 11.

When the remote controller function icon 61 is tapped, the control function unit 272 shifts the display screen of the display unit 22 from the control initial screen 60 to the remote controller screen 70.

On the remote controller screen 70, a current gradient value 71 and operation icons 72 to 76 are displayed. As operation buttons, a reference laser irradiation mode switching icon 72, a vertical laser ON/OFF icon 73, a lock icon 74, a gradient setting icon 75, and a line control function icon 76 are displayed.

Here, when the reference laser irradiation mode switching icon 72 is tapped, the control function unit 272 shifts the display on the display unit 22 to the reference laser irradiation mode selection screen 80. On the reference laser irradiation mode selection screen 80, by tapping any of the irradiation mode (here, normal mode, blink mode, and energy-saving mode) buttons 81, the control function unit 272 sets the reference laser irradiation mode of the pipe laser 1 to a selected mode via the near field wireless communication unit 26. The reference laser irradiation mode switching icon 72 may be displayed in a different color scheme depending on the irradiation mode on the remote controller screen 70.

In a turned-on state of the vertical laser of the pipe laser 1, when the vertical laser ON/OFF icon 73 is tapped, the control function unit 272 turns OFF the vertical laser of the pipe laser 1 via the near field wireless communication unit 26. At this time, although no shift from the remote controller screen 70 is made, the pictogram representing the vertical laser status 66*b* displayed on the control initial screen 60 changes as illustrated in FIG. 11 (in the figure, the dashed line indicates that nothing is displayed at this portion). In a turned-off state of the vertical laser of the pipe laser 1, when the vertical laser ON/OFF icon 73 is tapped, the control function unit 272 turns ON the vertical laser of the pipe laser 1 via the near field wireless communication unit 26. The vertical laser ON/OFF icon 73 may change in color according to the ON/OFF state on the control initial screen 60. Accordingly, the turned-on/off state of the vertical laser can be confirmed without returning to the control initial screen.

When the lock icon 74 is tapped, the control function unit 272 locks the gradient setting function and the line control function of the pipe laser 1, and inactivates the gradient setting button and the line control button. This is for preventing the gradient setting from being changed by mistake during remote control operation.

When the gradient setting icon 75 is tapped, the control function unit 272 displays a gradient setting screen 90 on the display unit 22. On the gradient setting screen 90, a set value input window 91, a setting button 92, and a gradient calculation button 93 are displayed. When a user inputs a set value in the set value input window 91 and taps the setting button 92, the control function unit 272 sets a gradient value of the pipe laser 1 via the near field wireless communication unit 26.

When the gradient calculation button 93 is tapped, the control function unit 72 displays a gradient value calculation screen 90A on the display unit 22. On the gradient value calculation screen 90A, a schematic diagram 94 of gradient value calculation, a window 95 for inputting an elevation of a pipe laser installation point A, an elevation of a target point B for which the gradient is set, and a horizontal distance D between the points A and B, and a calculation button 96 are displayed.

When the user inputs respective numerical values into the window 95 and taps the calculation button 93, the control function unit 272 calculates a gradient value from the input elevation of the pipe laser installation point A, the elevation of the target point B for which the gradient is set, and the horizontal distance D between the points A and B, and displays a calculation result display screen 90B on the display unit 22. When the user taps a setting button 97 on the calculation result display screen, the gradient value is set.

When the line control function icon 76 is tapped, the control function unit 272 displays a line control screen 110 on the display unit 22. On the line control screen 110, a pictogram 111 representing an irradiation status of the reference laser, an orientation change button 112 for changing the orientation of the reference laser in the horizontal direction, an auto centering button 114 for aligning the orientation of the reference laser with the center of the pipe laser 1, and an auto alignment icon 113 for automatically directing the reference laser toward the center of a target, are displayed. By tapping each button, the control function unit 272 causes the pipe laser 1 to execute each corresponding operation.

Returning to FIG. 10, when the work assisting function icon 62 is tapped, the control function unit 272 shifts the display screen of the display unit 22 from the control initial screen 60 to a work assisting screen 120. On the work assisting screen 120, a link button 121 for link to a website of the manufacturer providing support information such as an instruction handbook, etc., is displayed. By tapping this, the user can access the website and download the necessary information.

In respective items (folders) such as "instrument installation method" and "automatic leveling," etc., on the work assisting screen 120, an instruction handbook, etc., downloaded by the user as support information from the website of the manufacturer are classified into corresponding items and saved.

Next, when the control setting function icon 63 is tapped, the control setting function is executed. Specifically, the control function unit 272 causes the display unit 22 to display a control setting selection screen 130. On the control setting selection screen 130, an instrument information button 131 and a setting button 132 are displayed.

When the instrument information button 131 is tapped, the control function unit 272 acquires instrument information such as a model code, a serial number, and a CPU version, etc., from the pipe laser 1 via the near field wireless communication unit 26, and displays these on the display unit 22. When the setting button 132 is tapped, the control function unit 272 displays a setting screen (not illustrated) for making various settings related to the control function on the display unit.

When a user's operation is not performed for a predetermined period of time in a state where the remote control function, the work assisting function, and the control setting function are executed, the control function unit 272 returns the display to the control initial screen 60.

<Administrator Function>

Figure 12:
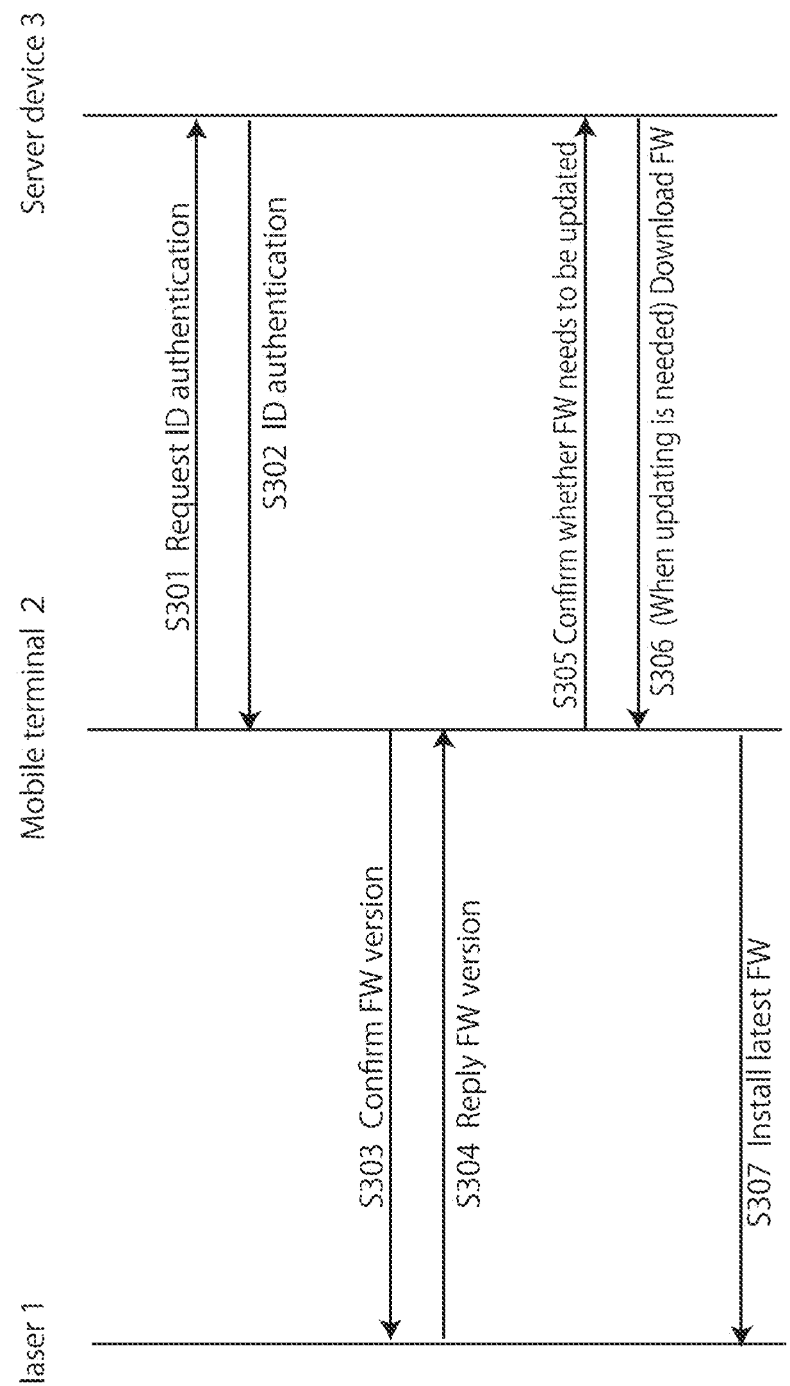
FIG. 12 is a sequence flow of firmware updating function processing to be executed by the app.

Next, processing when the administrator function is selected will be described. FIG. 12 illustrates a flow (sequence flow among the pipe laser 1, the mobile terminal 2, and the server device 3) of processing of ID authentication and firmware updating function in the administrator function.

In FIG. 6, when the administrator function icon 42 43 is tapped, the administrator function unit 273 displays an ID authentication screen 140 on the display unit 22. An ID and a password are set in advance by an administrator.

When a user inputs the ID and the password and taps a login button 141, in Step S301, the administrator function unit 273 requests the server device 3 to perform ID authentication. When the ID is authenticated from the server device 3, the administrator function unit 273 displays a management initial screen (not illustrated) on the display unit 22. On the management initial screen, a firmware updating function button corresponding to the firmware updating function and a log management button corresponding to the log managing function are displayed.

When the firmware updating function button is tapped, the administrator function unit 273 confirms version information of firmware of the pipe laser 1 in Step S303. In Step S304, when the administrator function unit 273 acquires version information of the firmware, in Step S305, it is necessary to confirm with the server device 3 whether the firmware of the pipe laser 1 is the latest, and update the firmware.

When the firmware needs to be updated, in Step S306, the administrator function unit 273 downloads the latest firmware from the server device. Next, in Step S307, the administrator function unit 273 installs the latest firmware downloaded from the server device 3 into the pipe laser 1.

Figure 13:
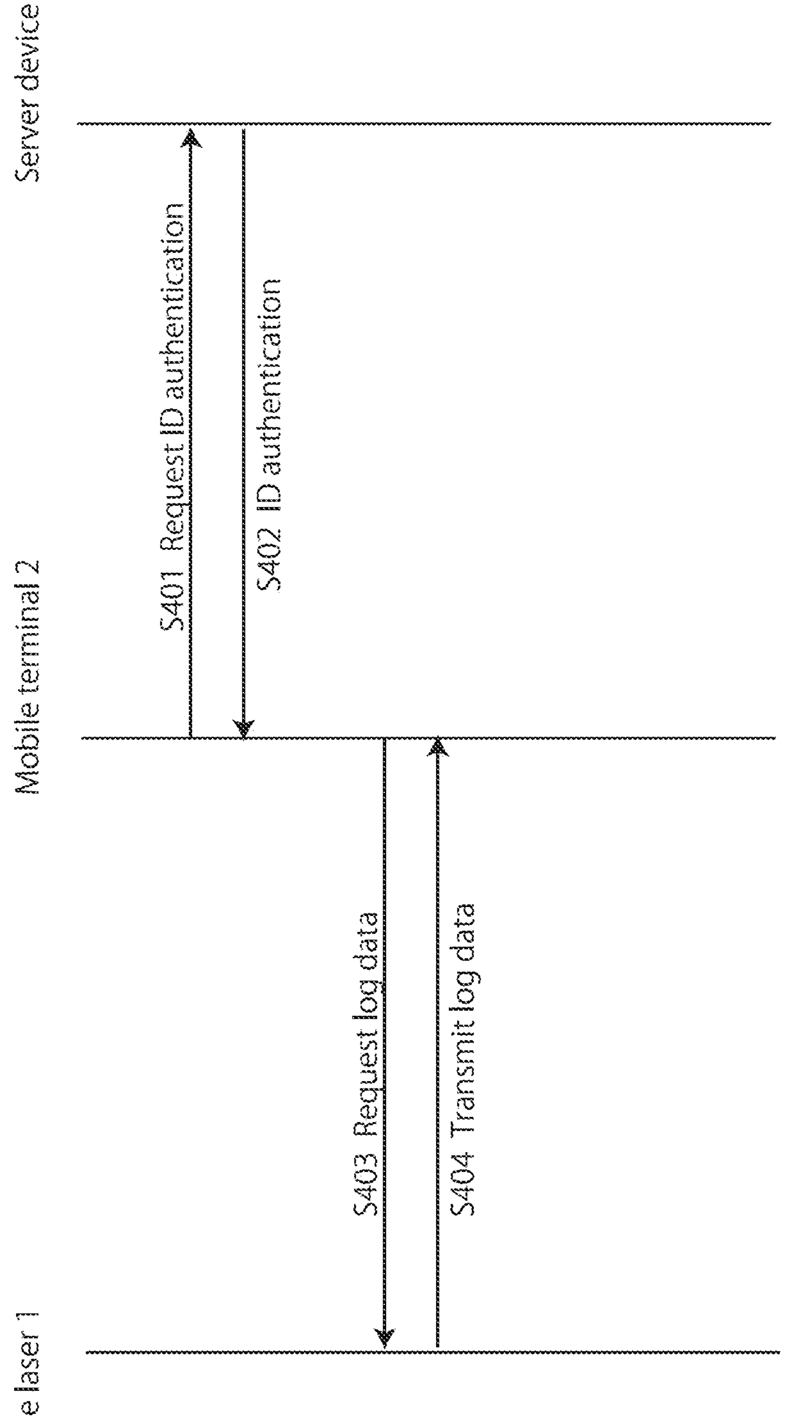
FIG. 13 is a sequence flow of log managing function processing to be executed by the app.

FIG. 13 illustrates a flow (sequence flow among the pipe laser 1, the mobile terminal 2, and the server device 3) of processing of ID authentication and log managing function in the administrator function. Steps S401 and S402 are processing of ID authentication, and are the same as in FIG. 12, so that description of these is omitted.

On the management initial screen, when the log management button is tapped, in Step S403, the administrator function unit 273 requests log information from the pipe laser 1. Next, in Step S404, the pipe laser 1 transmits log information to the mobile terminal 2 on request. The log information is, for example, a status log, an error log, etc. The administrator function unit 273 stores the log information in the storage unit 21 and manages the log information. The log information may be transmitted by e-mail to a predetermined address as necessary or at predetermined intervals.

<System Function>

Next, the system function will be described. In FIG. 6, when the system function icon 43 is tapped, the system function unit 274 causes the display unit 22 to display a system function screen 150. On the system function screen 150, a laser product support button 151, a setting button 152, and a version information button 153 are displayed.

When the laser product support button 151 is tapped, the screen shifts to the work assisting screen 120, and as with the work assisting function, necessary work assistance information can be downloaded from the website of the manufacturer and saved in the storage unit 21. In this way, by making the work assisting function available in a state where no connection to the pipe laser 1 is made, work assistance information is stored in advance in the mobile terminal 2, and even when the connection state of the work site with the communication network N is poor, the work assistance information can be used.

When the setting button 152 is tapped, the system function unit 274 can make various general app settings such as setting of a language for use of the app on the display unit 22, although not illustrated.

When the version information button 153 is tapped, the system function unit 274 displays various information of the app such as app version information, etc., on the display unit 22, although not illustrated.

In the present embodiment, functions for a user and functions for an administrator, including the control function to remotely operate the pipe laser 1, and firmware updating by an administrator such as a manufacturer or agent, can be realized with one device by using the same app.

Normally, concerning the laser device such as the pipe laser 1, the device itself is operated only when the device is installed, and the device does not always need to be operated. The device needs to be operated when, for example, the installed condition changes due to influence from vibration caused by an earthquake or a vehicle passing by, and during a work, it is important that the installed condition is stable. In the present embodiment, the mobile terminal 2 is configured to display status information on the control initial screen 60, so that a user can easily confirm the installed condition.

In the present embodiment, the mobile terminal 2 is configured to display a status of the pipe laser 1 by using pictograms on the control initial screen 60, so that a user can intuitively understand the status of the pipe laser. In addition, since the remote controller function icon 61 is disposed on the control initial screen 60 in place of various operation buttons, the display of the status information can be relatively enlarged, and even with a mobile terminal such as a smartphone or a portable game machine having a comparatively small screen, the user can easily recognize the operation status of the laser device main body. In addition, when it is desired to remotely operate the laser device main body, an operation button can be displayed simply by tapping or clicking an icon for calling the remote controller function, and this is convenient.

In the present embodiment, the control function unit 272 is configured to acquire status information in real time and display the status information on the control initial screen 60, and when there is an abnormality in the status information, display a warning and stop the remote controller function. With the configuration described above, a user can confirm an abnormality of the pipe laser 1 in real time, and prevent continuation of a work in the abnormal state. The warning includes measures for solving the abnormality, so that the user can take proper measures for solving the abnormality simply by acting according to the warning.

In the present embodiment, the control function unit 272 has a work assisting function, and displays a work assisting function icon 62 for calling the work assisting function on the control initial screen 60, so that a user can easily access information such as an instruction handbook and a manual, etc., necessary during a work, and convenience in the work is improved.

In the embodiments described above, examples using the pipe laser 1 as the laser device have been described, however, the present invention is also applicable to other laser devices such as rotary laser devices, etc., which can detect a horizontal plane, emit a laser, and set a predetermined gradient.

Preferred embodiments of the present invention have been described above, and the embodiments described above are examples of the present invention, and these can be combined based on knowledge of a person skilled in the art, and such a combined embodiment is also included in the scope of the present invention.

REFERENCE SIGNS LIST

1: Pipe laser (laser device)
2: Mobile terminal (information processing device)
3: Server device
18: Control unit
19: Near field wireless communication unit
21: Storage unit
22: Display unit
23: Operation unit
26: Near field wireless communication unit
27: Control unit
60: Control initial screen
272: Control function unit
273: Administrator function unit
N: Communication network

The invention claimed is:

1. An information processing device comprising:

a processor;

a display;

an operation unit; and a near field wireless communication unit capable of communicating with a laser device detecting horizontality and emitting a plurality of laser beams, one of which at a set gradient, wherein the processor causes the information processing device by executing program instructions to realize a remote controller function to remotely operate the laser device via the near field wireless communication unit, to acquire status information showing an operation status of the laser device connected via the near field wireless communication unit, and to display, on a control initial screen, a plurality of pictograms representing the operation status of the connected laser device corresponding to the status information and an icon for calling the remote controller function to shift the control initial screen to a remote controller screen for remote operating state, but not to display an operation icon for remotely controlling the laser device on the control initial screen, wherein one of the plurality of pictograms is displayed as a combination of a pictogram simplifying an appearance of the laser device and an irradiation state of the plurality of laser beams, and the one of the plurality of pictograms represents the irradiation state in a color reflecting a color of the plurality of laser beams, wherein the one of the plurality of pictograms by itself indicates irradiation states and irradiation directions of the plurality of laser beams.

2. The information processing device according to claim 1, wherein after a user's operation is not performed for a predetermined period of time while the remote control function is being executed, the processor returns the remote controller screen to the control initial screen.

3. The information processing device according to claim 1, comprising:

a storage unit storing information for assisting a work using the laser device, wherein the processor causes the information processing device to make the information for assisting the work browsable, and the display displays an icon for calling a work assisting function on the control initial screen.

4. The information processing device according to claim 1, wherein the processor acquires the status information in real time or at predetermined intervals, determines whether there is an abnormality in the status information, and when there is an abnormality, displays a warning display on the display unit, and when the abnormality is solved, cancels the warning display.

5. The information processing device according to claim 1, further comprising:

a network communication unit capable of communicating with a server device via a communication network, wherein the processor includes an administrator function unit configured to manage the laser device, and the administrator function unit acquires version information of firmware of the laser device, and when the firmware is not a latest version, updates the firmware to the latest state.

6. The information processing device according to claim 5, wherein the administrator function unit acquires log data of the laser device via the near field wireless communication unit, and manages the log data.

7. An information processing device control method to be executed by an information processing device including a display unit having a control initial screen, a processor, an operation unit, and a near field wireless communication unit capable of wirelessly communicating with a laser device detecting a horizontality and emitting a plurality of laser beams, one of which at a set gradient, the method comprising:

a step of acquiring status information showing an operation status of the laser device by the processor via the near field wireless communication unit; and a step of displaying, on the control initial screen of the display unit, a plurality of pictograms representing the operation status of the laser device corresponding to the status information, and an icon for causing the processor to execute a remote controller function to remotely operate the laser device connected via the near field wireless communication unit, on the control initial screen for remote operation to shift the control initial screen to a remote controller screen for remote operating state, but not displaying an operation icon for remotely controlling the laser device on the control initial screen, wherein one of the plurality of pictograms is displayed as a combination of a pictogram simplifying an appearance of the connected laser device and an irradiation state of the plurality of laser beams, and the one of the plurality of pictograms represents the irradiation state in a color reflecting a color of the plurality of laser beams, wherein the one of the plurality of pictograms by itself indicates irradiation states and irradiation directions of the plurality of laser beams.

8. A non-transitory computer-readable storage medium having a program for executing the information processing device control method according to claim 7 to be executed by the information processing device including the display, the processor, the operation unit, and the near field wireless communication unit capable of wirelessly communicating with the laser device detecting the horizontality and emitting the laser beam at a set gradient.

* * * * *